(12) United States Patent  (10) Patent No.: US 9,533,461 B2
Nishida  (45) Date of Patent: Jan. 3, 2017

(54) BEAD-RING WINDER

(75) Inventor: Kihachiro Nishida, Hashima (JP)

(73) Assignees: Fuji Seiko Co., Ltd. (JP); Fuji Shoji Co., Ltd. (JP)

( * ) Notice: Subject to any disclaimer, the term of this patent is extended or adjusted under 35 U.S.C. 154(b) by 166 days.

(21) Appl. No.: 14/389,184

(22) PCT Filed: Apr. 11, 2012

(86) PCT No.: PCT/JP2012/059937
§ 371 (c)(1),
(2), (4) Date: Sep. 29, 2014

(87) PCT Pub. No.: WO2013/153642
PCT Pub. Date: Oct. 17, 2013

(65) Prior Publication Data
US 2015/0083271 A1    Mar. 26, 2015

(51) Int. Cl.
B29D 30/48 (2006.01)
B21C 47/06 (2006.01)

(52) U.S. Cl.
CPC ............ B29D 30/48 (2013.01); B21C 47/063 (2013.01); *B29D 2030/487* (2013.01)

(58) Field of Classification Search
CPC ... B29D 30/48; B29D 2030/487; B21C 47/04; B21C 47/06; B21C 47/063; B21C 47/24; B21C 47/28; B21C 47/34
See application file for complete search history.

(56) References Cited

U.S. PATENT DOCUMENTS

| 1,408,463 | A | * | 3/1922 | Miles | ........................ | B66D 1/30 |
| | | | | | | 242/608.4 |
| 2,190,805 | A | * | 2/1940 | Shook | .................... | B29D 30/48 |
| | | | | | | 140/92.2 |
| 2,902,083 | A | * | 9/1959 | White | .................... | B29D 30/48 |
| | | | | | | 152/539 |
| 4,060,209 | A | * | 11/1977 | Tsukamoto | ........... | B21C 47/245 |
| | | | | | | 242/129 |
| 4,827,752 | A | * | 5/1989 | Alcock | .................... | B21C 1/08 |
| | | | | | | 242/156.1 |
| 5,385,621 | A | * | 1/1995 | Golightly | ................ | B29B 15/14 |
| | | | | | | 156/136 |

(Continued)

FOREIGN PATENT DOCUMENTS

CN    101998904 A    3/2011
CN    102294416 A    12/2011
(Continued)

OTHER PUBLICATIONS

Translation of the International Preliminary Report on Patentability for PCT/JP2012/059937, mailed Jul. 17, 2012, pp. 1-5.
(Continued)

*Primary Examiner* — Edward Tolan
(74) *Attorney, Agent, or Firm* — Tarolli, Sundheim, Covell & Tummino LLP

(57) ABSTRACT

A winding unit is formed in an annular pattern along the outer circumferential surface of a rotary body rotatable about a shaft. The winding unit has multiple alignment grooves in which a wire is wound and turns of the wire are aligned. The winding unit is provided with an ungrooved part formed to straddle the alignment grooves.

5 Claims, 5 Drawing Sheets

(56) References Cited

U.S. PATENT DOCUMENTS

2001/0023737 A1 9/2001 Caretta et al.
2011/0030835 A1 2/2011 Morisaki

FOREIGN PATENT DOCUMENTS

| CN | 202174748 | 3/2012 |
|---|---|---|
| JP | 46-29089 B1 | 8/1971 |
| JP | 9-267410 A | 10/1997 |
| JP | 11-170822 A | 6/1999 |
| JP | 2009-12326 A | 1/2009 |
| JP | 2011-37059 A | 2/2011 |
| RU | 2213008 C | 9/2003 |
| SU | 1381002 A | 3/1988 |
| WO | WO 2009/128286 A1 | 10/2009 |

OTHER PUBLICATIONS

International Search Report for corresponding PCT/JP2012/059937, completed Jul. 6, 2012 by the JPO.
Chinese Office Action for corresponding CN201280072163.X dated Jul. 1, 2015.

* cited by examiner

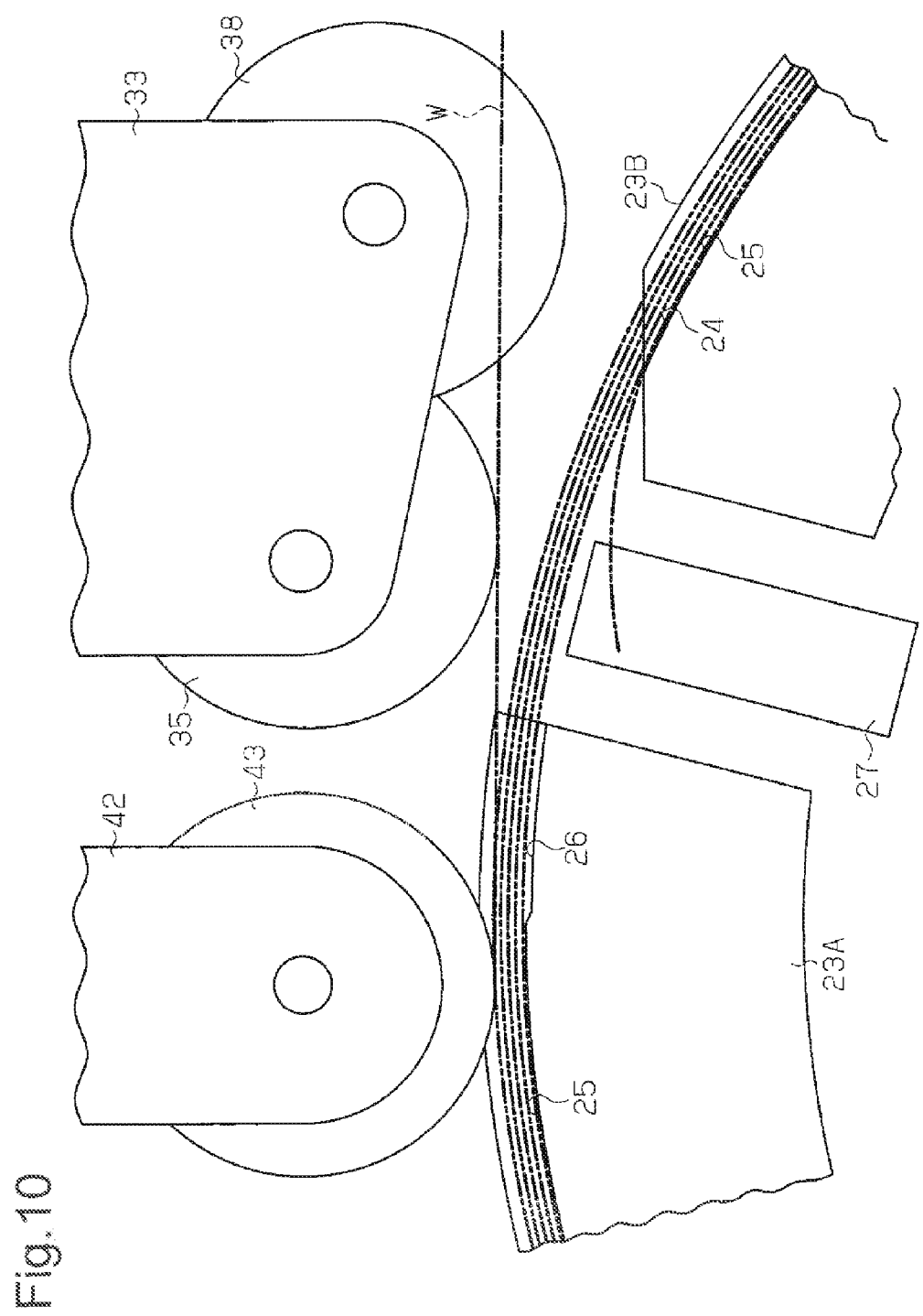

BEAD-RING WINDER

RELATED APPLICATIONS

The present invention is a U.S. National Stage under 35 USC 371 patent application, claiming priority to Serial No. PCT/JP2012/059937, filed on 11 Apr. 2012, the entirety of which is incorporated herein by reference.

FIELD OF THE INVENTION

This invention relates to a bead ring winding machine to form a bead ring used, for example, for vehicle tires.

BACKGROUND OF THE INVENTION

A bead ring winding machine of this type is disclosed, for example, in Patent Document 1. In this conventional structure, an annular recessed part used for winding a wire in rows and in tiers is formed in the outer circumferential surface of a circular bead former rotatable about a shaft. The inner bottom portion of the recessed part is provided with multiple alignment grooves in which turns of the wire in the innermost circumference are guided and aligned at regular intervals.

The alignment grooves described in Patent Document 1 include a circumferential groove in which the wire is wound substantially one turn in the circumferential direction of the bead former and an oblique groove formed between adjacent circumferential grooves. The oblique groove is used to guide the wire wound in one circumferential groove to a next circumferential groove. Patent Document 1 further discloses an alignment groove formed in a spiral pattern. In this structure, the wire is wound in a spiral pattern on the bead former.

The alignment grooves of the bead ring winding machine of Patent Document 1 include the circumferential groove and the oblique groove. Thus, a winding orbit of the wire in the innermost circumference is changed forcibly in a short turning region of the oblique groove. However, the high stiffness of the wire makes it difficult to shift the wire to a next circumferential groove smoothly along the oblique groove. This may unfortunately result in an irregular winding condition. The structure of forming the alignment groove in a spiral pattern forms each of a side edge portion of the alignment groove where winding starts and a side edge portion of the alignment groove where the winding ends into a narrow width. This makes it impossible to align turns of the wire in the innermost circumference in a position where winding starts and in a position where the winding ends. This may unfortunately result in an irregular winding condition, so that the wire wound outside the wire in the innermost circumference may collapse easily. Such collapse of winding of the wire in the innermost circumference causes an unstable inner circumferential length of a bead ring. Further, winding the entire wire in a spiral pattern places the wire in a direction tilted to the axis line of the bead ring. This may cause an unstable inner circumferential length of the bead ring or place the wire at a tilt. This may unfortunately damage the grasping function of a tire bead part as a function inherent to the bead ring.

PRIOR ART DOCUMENTS

Patent Documents

Patent Document 1: Japanese Laid-Open Patent Publication No. 2009-12326

SUMMARY OF THE INVENTION

It is an object of this invention to provide a bead ring winding machine capable of winding a wire without causing an irregular winding condition during formation of a bead ring by winding.

In order to solve the aforementioned problem, one aspect of this invention provides a bead ring winding machine including a rotary body rotatable about a shaft. The rotary body has an outer circumferential surface provided with an annular winding unit. The winding unit has multiple alignment grooves in which turns of a wire are aligned. The winding unit is provided with an ungrooved part formed to straddle the alignment grooves.

In this structure, while the wire in the innermost circumference is wound into the winding unit in response to rotation of the rotary body, the wire is wound substantially one turn along one alignment groove and then the wire shifts to a next alignment groove in the ungrooved part. This realizes pitch feed of the wire between the alignment grooves smoothly in the ungrooved part. Thus, turns of the wire wound in the innermost circumference can be aligned without causing an irregular winding condition. As a result, the wire to be wound outside the wire in the innermost circumference will not collapse. This makes it possible to obtain a bead ring by high-speed winding having a stable inner circumferential length.

In the aforementioned bead ring winding machine, it is preferable that the outer circumferential surface of the rotary body is provided with multiple partitioned members partitioned in a circumferential direction such that the partitioned members are movable in a radial direction of the rotary body, that the partitioned members form the winding unit, and that the ungrooved part is formed at an end part of one of the partitioned members in a direction in which the wire is wound.

In the aforementioned bead ring winding machine, it is preferable that a width of a gap including the ungrooved part defined between adjacent ones of the partitioned members is in a range from 30 to 110 mm, and that the ungrooved part has a length in the circumferential direction from 40% to 80% of the width.

In the aforementioned bead ring winding machine, it is preferable that a guide roller is arranged on an upstream side relative to the ungrooved part and between the partitioned member with the ungrooved part and a different partitioned member adjacent to the partitioned member with the ungrooved part, and that the guide roller guides feed of the wire in a row direction.

In the aforementioned bead ring winding machine, it is preferable that the guide roller is movable in an axial direction of the rotary body, that a different guide roller that guides the wire to the guide roller is arranged on an upstream side relative to the guide roller in a direction in which the wire travels, and that the different guide roller is movable in the axial direction integrally with the guide roller.

In the aforementioned bead ring winding machine, it is preferable that a pressure roller to press the wire against the winding unit is arranged on a downstream side relative to the guide roller.

This invention is capable of winding a wire without causing an irregular winding condition during formation of a bead ring by winding.

BRIEF DESCRIPTION OF DRAWINGS

FIG. 10 is a partial front view showing a condition where the wire is wound further into the winding unit.

DETAILED DESCRIPTION OF THE PREFERRED EMBODIMENTS

An embodiment that embodies a bead ring winding machine of this invention is described below by referring to FIGS. 1 to 10.

Figure 1:
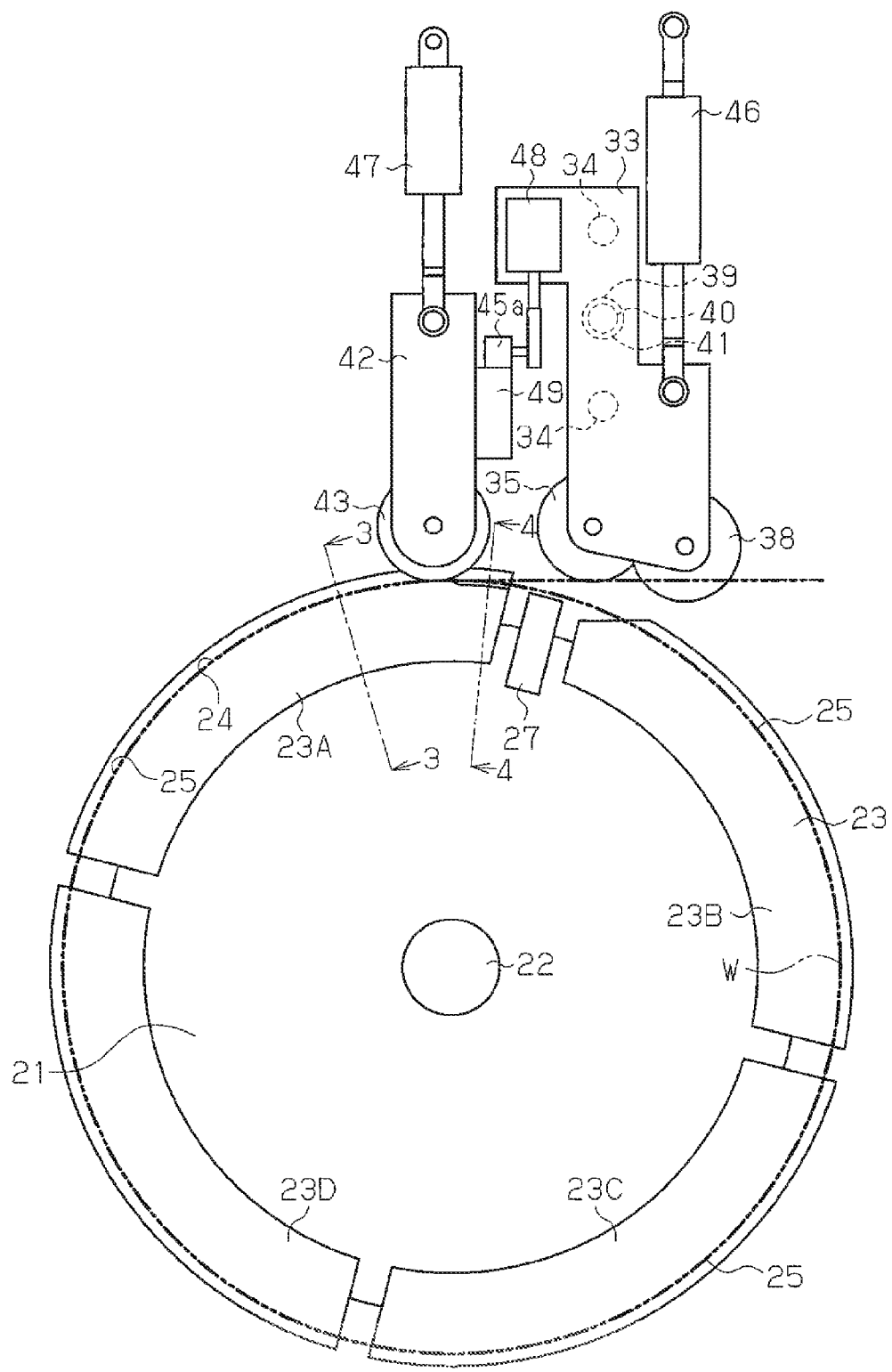
FIG. 1 is a front view showing a bead ring winding machine according to a first embodiment of this invention.

As shown in FIG. 1, a rotary body 21 is supported to a frame not shown in the drawings such that the rotary body 21 can rotate about a horizontal shaft 22 as a central axis line (uniaxial line) of the rotary body 21. The rotary body 21 is rotated in the anticlockwise direction of FIG. 1 by a motor not shown in the drawings. Multiple partitioned members 23A to 23D are provided on the outer circumferential surface of the rotary body 21. The partitioned members 23A to 23D are arranged at intervals in the circumferential direction of the rotary body 21 and are formed into an arcuate shape. A driving mechanism, such as a motor or an air cylinder not shown in the drawings, moves the partitioned members 23A to 23D inward or outward in the radial direction of a circle centered about the horizontal shaft 22. Each of the partitioned members 23A to 23D has an outer circumference provided with a winding unit 23 used for winding a wire W. The winding unit 23 is arranged in an annular region of each of the partitioned members 23A to 23D. The wire W is formed by covering the outer circumferential surface of a wire of a metal such as steel with rubber.

Figure 2:
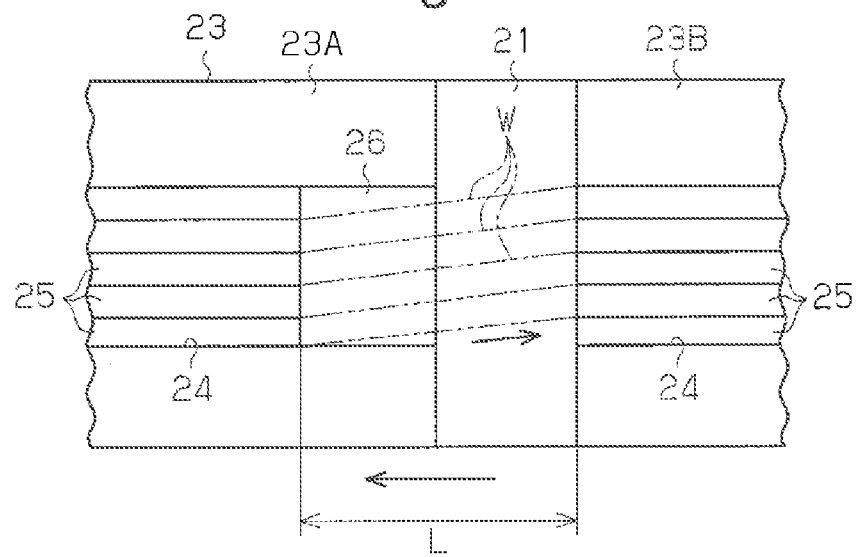
FIG. 2 is a partial plan view showing part of a winding unit on a rotary body in an enlarged manner.
Figure 3:
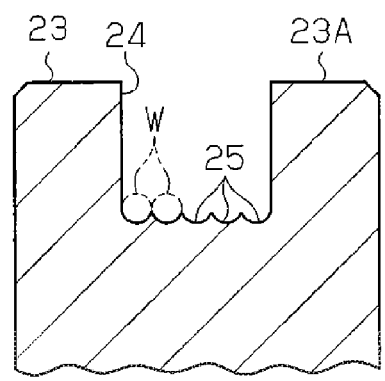
FIG. 3 is a sectional view taken along line 3-3 of FIG. 1.

As shown in FIGS. 2 and 3, the outer circumferential surface of each of the partitioned members 23A to 23D is provided with a recessed part 24. The recessed part 24 is used for winding the wire W in rows and in tiers to form a bead ring. The inner bottom portion of the recessed part 24 is provided with multiple alignment grooves 25 in which turns of the wire W in the innermost circumference are guided and aligned at regular intervals. The alignment grooves 25 are substantially semicircular in cross section.

Figure 4:
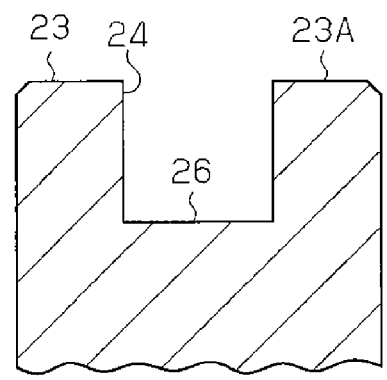
FIG. 4 is a sectional view taken along line 4-4 of FIG. 1.

As shown in FIGS. 1, 2 and 4, the recessed part 24 of the partitioned member 23A out of the partitioned members 23A to 23D has a side edge portion where winding of the wire ends. This side edge portion is provided with an ungrooved part 26 formed to straddle the alignment grooves 25 of the adjacent two partitioned members 23A and 23B. As shown by chain lines of FIG. 2, during winding of the wire W in the innermost circumference into the recessed part 24, the wire W is wound substantially one turn along one alignment groove 25 and then the wire W shifts to a next alignment groove 25 in the ungrooved part 26.

As shown in FIG. 2, a width L including the ungrooved part 26 defined between the adjacent partitioned members 23A and 23B (dimension of the rotary body 21 in the circumferential direction) has a value in a range from 30 to 110 mm. This value is preferably within a range from 40 to 90 mm, more preferably within a range from 50 to 80 mm, and most preferably, 70 mm. In this case, in terms of stability of winding of the wire, it is preferable that the ungrooved part 26 has a length in a circumferential direction of 40% or more of the width L.

As shown in FIG. 1, the rotary body 21 is provided with a clamp 27 by which an end part of the wire W is clamped where winding of the wire W starts. The clamp 27 is arranged on an upstream side relative to the ungrooved part 26. Specifically, the clamp 27 is arranged between the partitioned member 23A with the ungrooved part 26 and the different partitioned member 23B adjacent to the partitioned member 23A. The clamp 27 is opened and closed in a width direction (axial direction of the horizontal shaft 22) by a driving mechanism such as a cylinder not shown in the drawings. The clamp 27 clamps the beginning of the wire W when the clamp 27 is closed.

Figure 5:
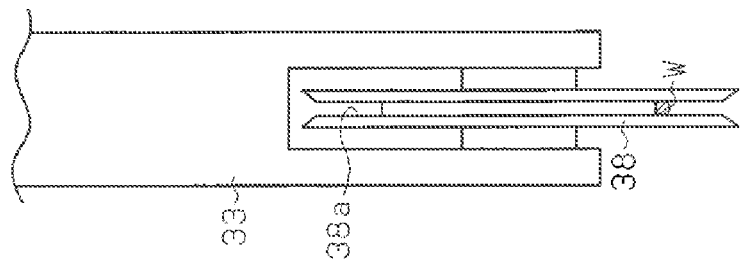
FIG. 5 is a sectional view showing a relationship between a clamp roller and a wire.
Figure 6:
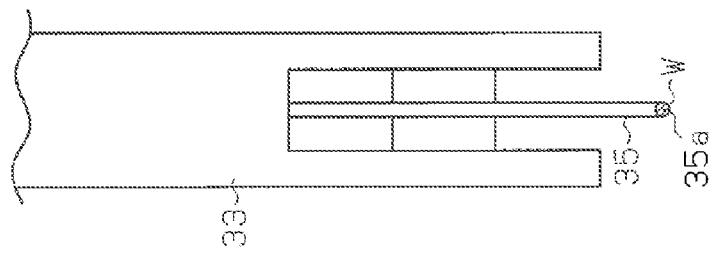
FIG. 6 is a sectional view showing a relationship between a guide roller and the wire.

As shown in FIGS. 1 and 5, a first support plate 33 is supported on a frame not shown in the drawings above the rotary body 21 such that the first support plate 33 can move in the radial direction of the rotary body 21. The first support plate 33 is further supported through a pair of guide rods 34 such that the first support plate 33 can move along the horizontal shaft 22. The first support plate 33 has a lower end that supports a first guide roller 35 such that the first guide roller 35 can rotate about an axis line parallel to the horizontal shaft 22. The outer circumferential surface of the first guide roller 35 is provided with a groove part 35a. The groove part 35a is used to guide the wire W to a given position in the recessed part 24.

As shown in FIGS. 1 and 5, the lower end of the first support plate 33 supports a second guide roller 38 as a different guide roller such that the second guide roller 38 can rotate about an axis line parallel to the rotary axis line of the first guide roller 35. The second guide roller 38 is arranged on an upstream side relative to the first guide roller 35 in a direction in which the wire travels. The second guide roller 38 is provided with a guide groove part 38a used to guide the wire W to the first guide roller 35. When the first support plate 33 moves along the horizontal shaft 22, the first and second guide rollers 35 and 38 move integrally in the same direction.

As shown in FIG. 1, the first support plate 33 is connected to a driving mechanism 39 to make the first and second guide rollers 35 and 38 traverse by feeding a pitch of the wire W. The driving mechanism 39 moves the first and second guide rollers 35 and 38 along the horizontal shaft 22 integrally with the first support plate 33. The driving mechanism 39 is formed of a ball screw 40 provided on the first support plate 33, a nut 41 threaded to the ball screw 40 in a manner that allows rotation of the nut 41 and movement of the nut 41 relative to the ball screw 40, and a motor, not shown in the drawings, to rotate the nut 41.

Figure 7:
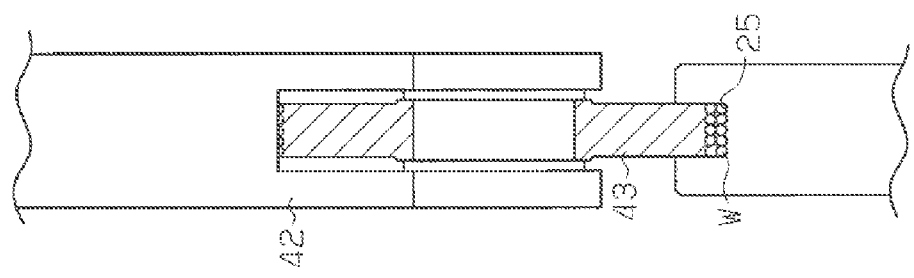
FIG. 7 is a sectional view showing a relationship between a pressure roller and the wire.
Figure 8:
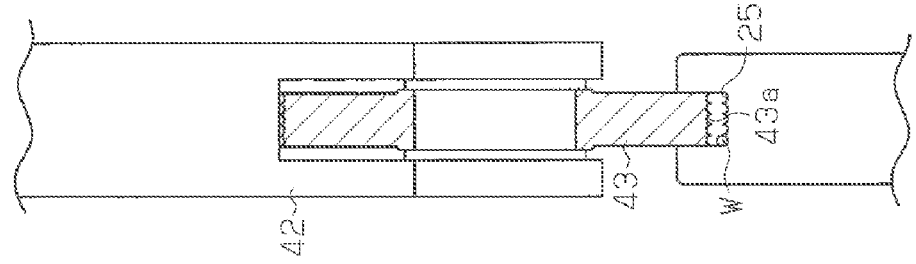
FIG. 8 is a sectional view showing a relationship between the pressure roller and the wire.

As shown in FIGS. 1, 7 and 8, a second support plate 42 is supported on a frame such that the second support plate 42 can move in the radial direction of the rotary body 21. The second support plate 42 is arranged on a downstream side relative to the first support plate 33 in the direction in which the wire travels. The second support plate 42 has a lower end that supports a pressure roller 43 in a manner that allows rotation of the pressure roller 43. The pressure roller 43 rotates about an axis line parallel to the rotary axis line of the first guide roller 35 on a downstream side relative to the first guide roller 35. The outer circumferential surface of the pressure roller 43 is provided with multiple pressure groove parts 43a formed to be responsive to corresponding ones of the alignment grooves 25 in the winding unit 23. The pressure groove parts 43a are used to press the wire W against the inside of the recessed part 24 of the winding unit 23 while aligning turns of the wire W to be wound outside the wire W in the innermost circumference.

As shown in FIG. 1, a first cylinder 46 is connected to the first support plate 33. The first cylinder 46 moves the first and second guide rollers 35 and 38 between their lower operative positions in which the first and second guide rollers 35 and 38 fit the wire W, and their upper inoperative positions in which the first and second guide rollers 35 and 38 are separated from the wire W. A second cylinder 47 is connected to the second support plate 42. The second cylinder 47 moves the pressure roller 43 between a lower operative position in which the pressure roller 43 is placed near the winding unit 23 on the rotary body 21, and an upper inoperative position in which the pressure roller 43 is separated from the winding unit 23. While the wire W is wound into the winding unit 23, the projecting actions of the first and second cylinders 46 and 47 move the first and second guide rollers 35 and 38 and the pressure roller 43 to their operative positions.

As shown in FIG. 1, a third cylinder 48 is supported on the first support plate 33. A tip of a piston rod of the third cylinder 48 supports a roller 45a. A receiving part 49 is attached to the second support plate 42. The roller 45a fits the receiving part 49 from above such that the roller 45a can move in a direction of an axis line. The pressing force of the third cylinder 48 is larger than that of the second cylinder 47. The pressing force of the second cylinder 47 is larger than that of the first cylinder 46. As a result, the first support plate 33 is coupled to the second support plate 42 through the third cylinder 48, the roller 45a, the receiving part 49 and the like such that the first support plate 33 can move integrally with the second support plate 42. The first support plate 33 can move in a direction in which the first support plate 33 gets away from the winding unit 23.

After the wire W in the innermost circumference is wound into the winding unit 23, the wire W is wound outside the innermost circumference while being pressed by the pressure roller 43. During this winding, in response to change in the number of winding tiers, the pressure roller 43 moves up in a direction in which the pressure roller 43 moves away from the winding unit 23. The pressure roller 43 moves up while applying pressing force to the wire W given by the third cylinder 48. This maintains the height of a path line for the wire W constant between the pressure roller 43 and the first and second guide rollers 35 and 38.

The action of the aforementioned bead ring winding machine is described next.

In preparation for starting winding by the bead ring winding machine, the first support plate 33 is placed in a given start position in the axial direction of the horizontal shaft 22. The second and first guide rollers 38 and 35 face an alignment groove 25 in an end part of the winding unit 23 where the winding starts. In this condition, an end part of the wire W where the winding of the wire W starts is fed by a wire source not shown in the drawings and clamped by the clamp 27. Then, in response to projecting actions of the first and second cylinders 46 and 47, the first and second guide rollers 35 and 38 move to their lower operative positions to make the wire W fit into the respective groove parts 35a and 38a of the first and second guide rollers 35 and 38. At this time, the third cylinder 48 is in an inoperative condition and the pressure roller 43 is arranged in an upper retreat position by the second cylinder 47.

Figure 9:
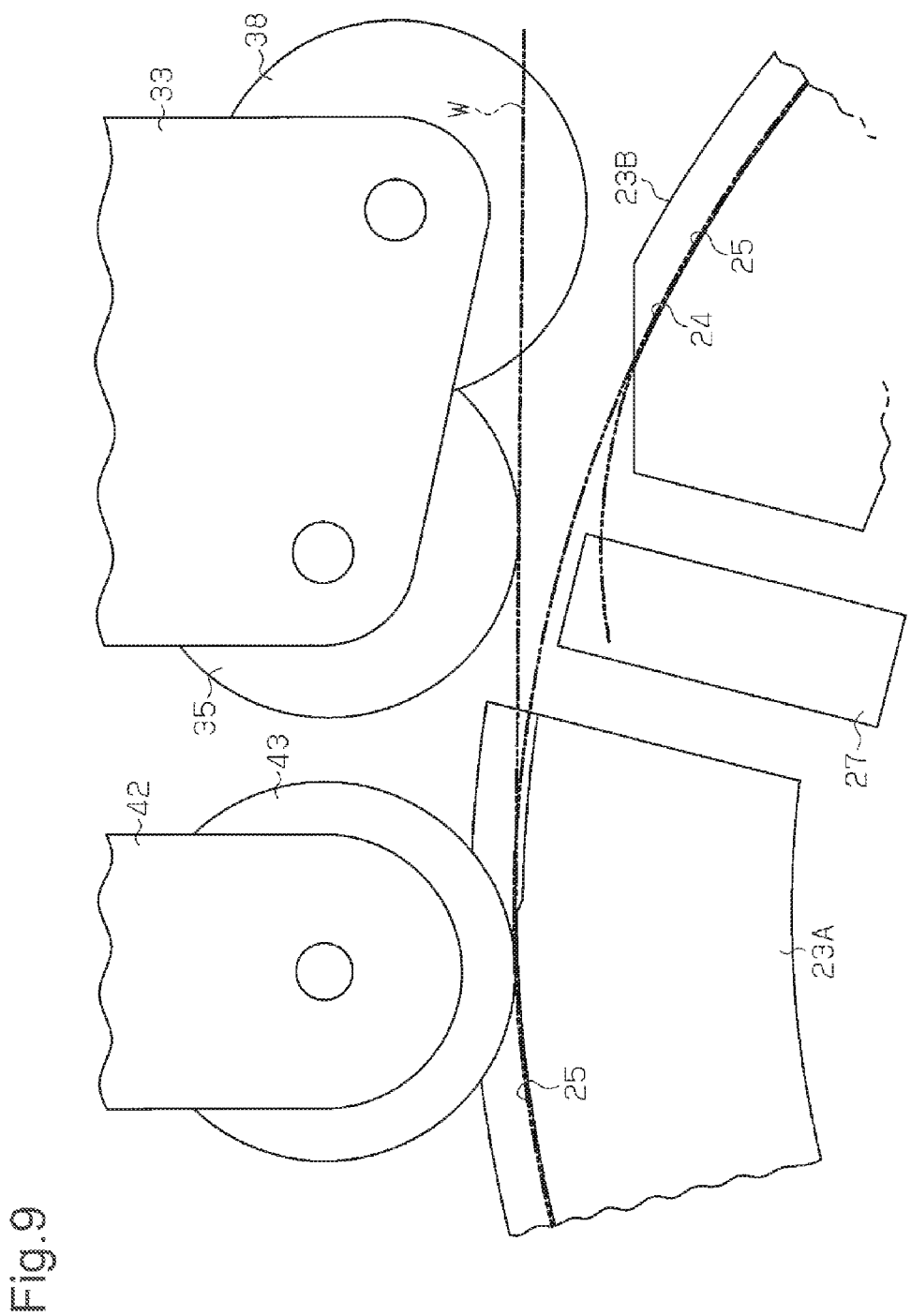
FIG. 9 is a partial front view showing a condition where the wire is wound into the winding unit.

In this condition, the rotary body 21 rotates in the anti-clockwise direction of FIG. 1 to wind the wire W into the recessed part 24 of the winding unit 23 as shown in FIG. 9. At this time, the wire W is guided to the first guide roller 35 by the second guide roller 38 and is guided to a given winding position in the recessed part 24 by the first guide roller 35. As a result, while the wire W in the innermost circumference (first tier) is wound into the recessed part 24, turns of the wire W are aligned at regular intervals along the alignment grooves 25 of the recessed part 24.

During winding of the wire W in the innermost circumference, each time the wire W is wound substantially one turn and the ungrooved part 26 is arranged to face the second and first guide rollers 38 and 35, the first support plate 33 moves one winding pitch along the horizontal shaft 22. The second and first guide rollers 38 and 35 move one winding pitch accordingly together with the first support plate 33. This moves the wire W one winding pitch of the wire W in the ungrooved part 26 where the alignment grooves 25 are not formed. As a result, as shown by the chain lines of FIG. 2, the wire W shifts to a next alignment groove 25 smoothly in the ungrooved part 26 after the wire W is wound substantially one turn along one alignment groove 25.

When winding of the wire W in the innermost circumference (first tier) is finished, the wire W is wound in a second tier and in subsequent tiers outside the wire W in the innermost circumference together with pitch feed by the driving mechanism 39. While the wire W is wound in the second tier and in subsequent tiers, the pressure roller 43 moves down by the second cylinder 47 to a position where the pressure roller 43 presses the wire W and is held in this position by the third cylinder 48. The wire W is guided along the pressure groove parts 43a of the pressure roller 43 and is pressed against the inside of the recessed part 24 of the winding unit 23 while the second and first guide rollers 38 and 35 feed a pitch of the wire W. In this way, the wire W in an upper tier is made to contact tightly with the wire W in a lower tier.

While the wire W is wound in the second tier and in subsequent tiers, the position of the wire W being held by the third cylinder 48 moves up in response to change in the number of winding tiers. This moves up the pressure roller 43 in a direction in which the pressure roller 43 gets away from the winding unit 23 and moves up the first and second guide rollers 35 and 38 integrally through the third cylinder 48 and the like. As a result, the respective heights of the first and second guide rollers 35 and 38 are maintained at levels corresponding to the height of the pressure roller 43.

In this way, the wire W is wound in given rows and in given tiers to form a bead ring as shown in FIG. 10. Then, the wire W is cut by a cutting mechanism not shown in the drawings. Further, the end part of the wire W where the winding of the wire W started is released from the clamp by the clamp 27. Then, the third cylinder 48 is placed in an inoperative condition. Further, the first and second cylinders 46 and 47 make each of the rollers 38, 35 and 43 retreat upward and move each winding unit 23 inward of the radial direction. As a result, the bead ring is released from the bead ring winding machine. Next, the bead ring is transferred to a subsequent step by a transfer mechanism not shown in the drawings.

Accordingly, this embodiment achieves the effects as follows.

(1) The bead ring winding machine includes the annular winding unit 23 formed on the outer circumferential surface of the rotary body 21 rotatable about the shaft. The winding unit 23 is provided with the alignment grooves 25 in which the wire W is wound and turns of the wire W are aligned. Part of the winding unit 23 is provided with the ungrooved part 26 formed to straddle the alignment grooves 25. Thus, while the wire W in the innermost circumference is wound into the winding unit 23 in response to rotation of the rotary body 21, the wire W is wound substantially one turn along one alignment groove 25 and then the wire W shifts to a next alignment groove 25 in the ungrooved part 26. This realizes pitch feed of the wire W between the alignment grooves 25 smoothly in the ungrooved part 26. Thus, turns of the wire W wound in the innermost circumference can be aligned without causing an irregular winding condition. As a result, the wire W to be wound outside the wire W in the innermost circumference will not collapse. This makes it possible to obtain a high-quality bead ring having a stable inner circumferential length. Avoiding collapse of the wound wire W allows high-speed winding of the wire W, thereby achieving high production efficiency. A gap may be provided between the adjacent partitioned members 23A and 23B without providing the ungrooved part 26 in this gap. However, this does not achieve stable winding of the wire W, leading to reduced quality of a bead ring.

(2) The outer circumferential surface of the rotary body 21 is provided with the partitioned members 23A to 23D partitioned in the circumferential direction. Each of the partitioned members 23A to 23D can move in the radial direction of the rotary body 21 and forms the winding unit 23. The ungrooved part 26 is formed at an end part of the partitioned member 23A out of the partitioned members 23A to 23D in the direction in which the wire is wound. Thus, the ungrooved part 26 can be formed easily while a parts count is not increased.

(3) The clamp 27 is arranged on an upstream side relative to the ungrooved part 26. Specifically, the clamp 27 is arranged between the partitioned member 23A with the ungrooved part 26 and the different partitioned member 23B adjacent to the partitioned member 23A. The driving mechanism 39 is provided between the first guide roller 35 and the rotary body 21. The driving mechanism 39 moves the first guide roller 35 and the rotary body 21 relative to each other along the horizontal shaft 22. This allows smooth pitch feed of the wire W while the clamp 27 clamps the end part of the wire W where winding of the wire W starts.

(4) The first guide roller 35 is configured such that it can move in the axial direction of the rotary body 21. The second guide roller 38 to guide the wire W to the first guide roller 35 is arranged on an upstream side relative to the first guide roller 35 in the direction in which the wire travels. The second guide roller 38 can move in the axial direction integrally with the first guide roller 35. Thus, the second guide roller 38 guides the wire W to the first guide roller 35 during winding of the wire W. Integral movement of the first and second guide rollers 35 and 38 in the axial direction achieves pitch feed of the wire W with no difficulty.

(5) The pressure roller 43 to press the wire W against the winding unit 23 is provided on a downstream side relative to the first guide roller 35. The pressure roller 43 is provided with the pressure groove parts 43a. Thus, while the wire W is wound in multiple tiers outside the wire W in the innermost circumference, the pressure roller 43 can press the wire W against the winding unit 23 while aligning turns of the wire W. This can make collapse of the wire W unlikely to be wound outside the wire W in the innermost circumference.

This embodiment can be modified as follows.

Each of the partitioned members 23A to 23D of the winding unit 23 on the rotary body 21 may be provided with multiple recessed parts 24 spaced at intervals in the axial direction of the rotary body 21. Like in this embodiment, multiple alignment grooves 25 and an ungrooved part 26 may be formed in each of the recessed parts 24. Further, the first and second guide rollers 35 and 38 may be provided with multiple groove parts 35a and multiple groove parts 38a respectively formed to be responsive to corresponding ones of the recessed parts 24. The pressure roller 43 may be provided with multiple pressure groove parts 43a formed to be responsive to corresponding ones of the recessed parts 24. This allows winding of multiple wires W together, so that multiple bead rings can be formed simultaneously. This structure allows formation of multiple bead rings simultaneously in addition to achieving the effects (1) to (5) of this embodiment, thereby enhancing production efficiency.

A pitch of the wire W may also be fed by moving the rotary body 21 and the pressure roller 43 in the axial direction of the rotary body 21 relative to the first and second guide rollers 35 and 38.

The alignment grooves 25 or the pressure groove parts 43a may be changed to a triangular shape or a rectangular shape in cross section.

The pressure roller 43 may be omitted.

EXAMPLES

Three persons visually evaluated the finished conditions of bead rings depending on the width L of the gap including the ungrooved part 26 between the partitioned members 23A and 23B. Table 1 shows a result of the evaluation. The evaluation result was obtained with the ungrooved part 26 having a length in the circumferential direction of 50% of the width L. The evaluation result did not change with the length of from 40% to 80%. A better evaluation result might be obtained with the length of more than 80%. However, a value exceeding 80% is not a realistic value in terms of the need for ensuring space for installation of the clamp 27 between the partitioned members 23A and 23B and space for the partitioned members 23A and 23B to move.

TABLE 1

| LENGTH (L) | WIRE DIAMETER | | | | | |
|---|---|---|---|---|---|---|
| | 0.96 | 1.2 | 1.26 | 1.3 | 1.55 | 1.83 |
| 20 | x | x | x | x | x | x |
| 30 | ⊗ | x | x | x | x | x |
| 40 | ○ | ⊗ | ⊗ | ⊗ | x | x |
| 50 | ○ | ○ | ○ | ○ | ⊗ | ⊗ |
| 60 | ○ | ○ | ○ | ○ | ○ | ⊗ |
| 70 | ○ | ○ | ○ | ○ | ○ | ○ |
| 80 | ⊗ | ○ | ○ | ○ | ○ | ○ |
| 90 | ⊗ | ⊗ | ⊗ | ⊗ | ○ | ○ |
| 100 | x | ⊗ | ⊗ | ⊗ | ⊗ | ○ |
| 110 | x | x | x | x | ⊗ | ⊗ |
| 120 | x | x | x | x | x | ⊗ |

NUMERICAL VALUES ARE GIVEN IN UNITS OF mm

In Table 1, the vertical axis shows the width L of the gap and the horizontal axis shows the wire diameter (diameter) of the wire W. Bead rings with "x" of a narrow width L are those evaluated as not applicable for use by all the evaluators. In these bead rings, the pitch of the wire W was changed steeply in the row direction of the wire W due to the narrow width L. This made the wire W rise up onto a peak between adjacent alignment grooves 25 to cause irregular arrangement of the wire W. Bead rings with "x" of a wide width L are also those evaluated as not applicable for use by all the evaluators. In these bead rings, turns of the wire W could not be aligned accurately due to a wide gap in the circumferential direction between the alignment grooves 25 of the partitioned member 23A and those of the partitioned member 23B, thereby causing irregular arrangement of the wire W.

Bead rings with "⊗" are those not evaluated uniformly by the evaluators. Bead rings with "o" are those applicable for use in tires as they achieved accurate arrangement of the wire W.

As clearly understood from Table 1, a usable bead ring can be formed by winding with the width L of a range from 30 to 110 mm. The width L is preferably within a range from 40 to 90 mm, more preferably within a range from 50 to 80 mm, and most preferably, 70 mm.

What is claimed is:

1. A bead ring winding machine comprising a rotary body rotatable about a shaft, the rotary body having an outer circumferential surface provided with an annular winding unit, the winding unit having multiple alignment grooves in which turns of a wire are aligned,
   wherein the winding unit is provided with an ungrooved part formed to straddle the alignment grooves, and
   wherein the outer circumferential surface of the rotary body is provided with multiple partitioned members partitioned in a circumferential direction such that the partitioned members are movable in a radial direction of the rotary body, the partitioned members form the winding unit, the ungrooved part is formed at an end part of one of the partitioned members, and the end part is a side edge portion where winding of the wire ends in a direction in which the wire is wound.

2. The bead ring winding machine according to claim 1, wherein a width of a gap including the ungrooved part defined between adjacent ones of the partitioned members is in a range from 30 to 110 mm, and the ungrooved part has a length in the circumferential direction from 40% to 80% of the width.

3. The bead ring winding machine according to claim 2, wherein a guide roller is arranged on an upstream side relative to the ungrooved part and between the partitioned member with the ungrooved part and a different partitioned member adjacent to the partitioned member with the ungrooved part, and the guide roller guides feed of the wire in a row direction.

4. The bead ring winding machine according to claim 3, wherein the guide roller is movable in an axial direction of the rotary body, a different guide roller that guides the wire to the guide roller is arranged on an upstream side relative to the guide roller in a direction in which the wire travels, and the different guide roller is movable in the axial direction integrally with the guide roller.

5. The bead ring winding machine according to claim 3, wherein a pressure roller to press the wire against the winding unit is arranged on a downstream side relative to the guide roller.

* * * * *